W. BROWER.
Churns.

No. 152,895.   Patented July 14, 1874.

Witnesses:
A. P. Lacey
W. Beale Hale

Inventor:
William Brower
By W. Burris Atty

UNITED STATES PATENT OFFICE.

WILLIAM BROWER, OF SUGAR TREE, OHIO.

IMPROVEMENT IN CHURNS.

Specification forming part of Letters Patent No. 152,895, dated July 14, 1874; application filed June 10, 1874.

*To all whom it may concern:*

Be it known that I, WILLIAM BROWER, of Sugar Tree, in the county of Guernsey and State of Ohio, have invented certain new and useful Improvements in Churns; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which drawings—

Figure 1:
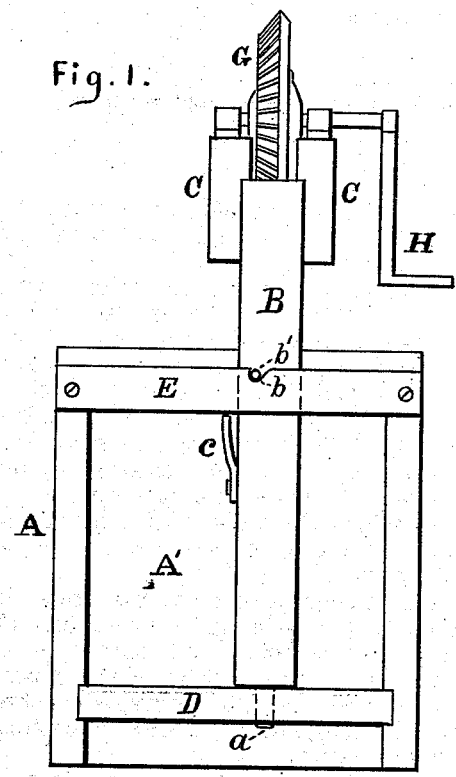
Figure 2:
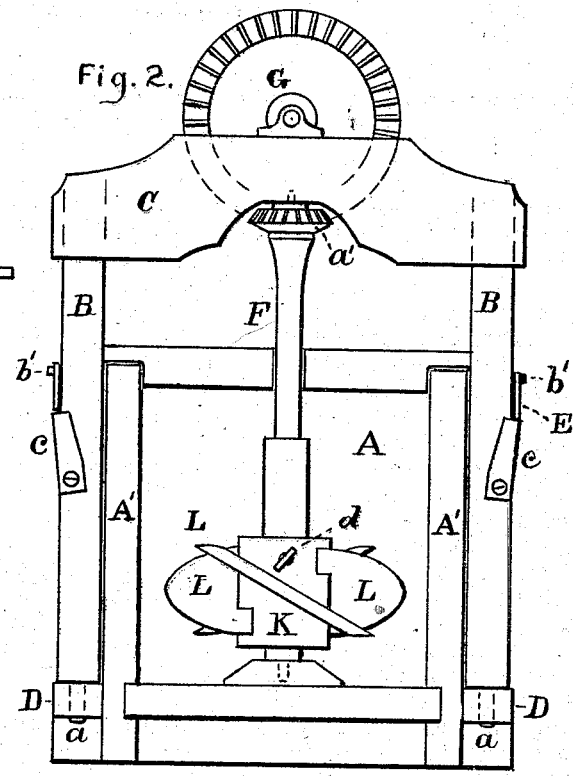
Figure 3:
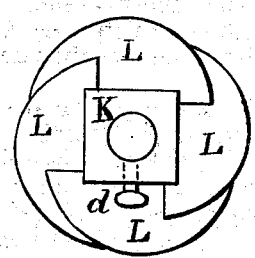

Figure 1 is an end elevation. Fig. 2 is a front elevation, with front wall removed. Fig. 3 is a top view of the dasher-block and oblique paddles.

My invention relates to a churn; and consists of a revolving oblique paddle-dasher, and of a removable frame carrying the devices for operating the dasher, arranged and held in position as hereinafter described.

A represents a rectangular churn, the end walls A' of which are set in from the ends of the side walls, forming recesses to receive the standards and their supports of the removable frame, as shown in the drawings. B B represent the standards, and C C cross-beams, of the removable frame carrying the drive-wheel. The lower ends of the standards rest on the support-bars D D, which are provided with holes to receive the pins $a$ $a$ on the ends of the standards to hold them in position laterally. E E represent bars, provided with notches $b$ $b$ to receive the pins $b'$ $b'$ on the sides of the standards, to hold the upper part thereof in position laterally. The standards are held vertically upon the support-bars by the adjustable catches $c$ $c$, attached to the standards, and arranged so that the upper ends of the catches, when moved outward, catch against the lower edges of the bars E E, as shown in the drawings. F is a dasher-staff, the ends of which are provided with pivots, and are arranged to revolve in suitable bearings in the cross-beam of the removable frame, and in the bottom of the churn. The upper end of the staff carries a beveled pinion, $a'$, arranged to be operated by the beveled drive-wheel G, provided with a crank, H, and having its bearings on the cross-beams C C. K represents a rectangular block, made with a hole to receive the staff F, and provided with a thumb-screw, $d$, so that the block may be adjusted at any required position on the staff. L L L L represent oblique paddles, attached in grooves on the sides of the block $k$. The paddles may be perforated, and are made and arranged so that their ends extend beyond the corners of the block, and to within about a half an inch of the walls of the churn, so that the whole body of the cream may be thoroughly stirred.

When the dasher is revolved the cream is carried downward by the oblique paddles, and thrown against the bottom and caused to rebound upward in the corners of the churn, whence it is again carried downward by the paddles. The angular block aids in cutting and stirring the cream.

To gather the butter the dasher-block is raised upon the staff till the upper ends of the paddles project about half an inch above the surface of the cream.

What I claim, and desire to secure by Letters Patent, is—

1. An adjustable churn-dasher provided with oblique paddles, constructed and operated substantially as and for the purposes described.

2. The combination of the oblique paddles L, adjustable block K, and staff F, substantially as and for the purposes described.

3. The removable framed support B C for the operating mechanism, arranged exterior to the churn, and held in position by the means set forth, substantially as and for the purposes described.

In testimony that I claim the foregoing as my own invention, I affix my signature in presence of two witnesses.

WILLIAM BROWER.

Witnesses:
    CYRUS LINN,
    JACOB STILES.